(12) United States Patent
Blacklock

(10) Patent No.: US 10,215,887 B2
(45) Date of Patent: Feb. 26, 2019

(54) DEPTH GAUGE

(71) Applicant: Gill Corporate Limited, Hampshire (GB)

(72) Inventor: Oliver Stewart Blacklock, Hampshire (GB)

(73) Assignee: Gill Corporate Limited, Hampshire (GB)

( * ) Notice: Subject to any disclaimer, the term of this patent is extended or adjusted under 35 U.S.C. 154(b) by 94 days.

(21) Appl. No.: 15/333,338

(22) Filed: Oct. 25, 2016

(65) Prior Publication Data

US 2018/0112977 A1 Apr. 26, 2018

(51) Int. Cl.
*G01W 1/14* (2006.01)
*G01B 11/06* (2006.01)
(Continued)

(52) U.S. Cl.
CPC ............... *G01W 1/14* (2013.01); *G01B 3/28* (2013.01); *G01B 11/0608* (2013.01);
(Continued)

(58) Field of Classification Search
CPC .. G01C 5/00; G01W 1/14; G01B 5/06; G01B 5/061; G01B 5/066; G01B 7/02; G01B 7/06; G01B 7/063; G01B 7/066; G01B 7/082; G01B 7/085; G01B 7/102; G01B 7/105; G01B 11/02; G01B 11/022; G01B 11/024; G01B 11/0236; G01B 11/06; G01B 11/0608; G01B 11/0616; G01B 11/0625; G01B 11/0633; G01B 11/0641; G01B 11/065; G01B 11/0658; G01B 11/0666; G01B 11/0675; G01B 11/0683; G01B 11/22

See application file for complete search history.

(56) References Cited

U.S. PATENT DOCUMENTS

| 2004/1089067 | | 5/2004 | Frank |
|---|---|---|---|
| 2007/0132599 | A1 | 6/2007 | DuFaux et al. |
| 2011/1219868 | | 9/2011 | Lane |

FOREIGN PATENT DOCUMENTS

| JP | 56125076 A | * | 9/1981 |
|---|---|---|---|
| JP | 03-242595 | | 10/1991 |

(Continued)

*Primary Examiner* — Gordon J Stock, Jr.
(74) *Attorney, Agent, or Firm* — Clark & Brody

(57) ABSTRACT

A depth gauge includes an upright elongate support (1) and several spaced emitters (2) and spaced detectors (3) mounted on the elongate support. The emitters (2) and detectors are electrically connected to a processor that sends signals to the emitters and receives signals from the detectors.

In a first aspect, at least two sets of emitters or at least two sets of detectors are mounted on the elongate support. The sets may be directed in different respective directions.

In a second aspect, each emitter may emit radiation, and/or each detector may detect radiation, selectively only within a selected range of frequencies, or emit/detect radiation outside the selected range only at a comparatively reduced level. Different emitters may emit radiation, and/or different detectors may detect radiation, only within different ranges of frequencies, or emit/detect radiation outside those ranges only at comparatively reduced levels.

11 Claims, 4 Drawing Sheets

(51) Int. Cl.
*G01C 5/00* (2006.01)
*G01B 11/22* (2006.01)
*G01B 3/28* (2006.01)

(52) U.S. Cl.
CPC .......... *G01B 11/0683* (2013.01); *G01B 11/22* (2013.01); *G01C 5/00* (2013.01)

(56) References Cited

FOREIGN PATENT DOCUMENTS

| | | |
|---|---|---|
| JP | 03-272492 | 12/1991 |
| JP | 04-48294 | 2/1992 |
| JP | 04-116424 | 4/1992 |
| JP | 04-252988 | 9/1992 |
| JP | 2000-258557 | 9/2000 |
| WO | 2013/114151 | 8/2013 |

\* cited by examiner

DEPTH GAUGE

BACKGROUND OF THE INVENTION

The present invention relates to a depth gauge comprising an elongate support which is intended to be in an upright orientation when in use, N sets of emitters, where N is an integer greater than 1, each set of emitters being mounted on the elongate support and being spaced apart therealong, and N sets of detectors, each set of detectors being mounted on the elongate support and being spaced apart therealong, the 2N sets being directed in different respective directions and the emitters and the detectors being electrically connected to a processor to enable the latter to send signals to the emitters and receive signals from the detectors.

One such gauge is described and illustrated in US 2011/219868 A1, for measuring the depth of snow.

BRIEF SUMMARY OF THE INVENTION

The present invention seeks to provide a gauge for measuring the depth of snow, especially if the snow may become caked against the emitters and the detectors in the event of driving wind conditions in which the snow is driven against the gauge to settle on the gauge before it has reached the ground.

Accordingly, the present invention is directed to a depth gauge having the construction set out in the opening paragraph of the present specification, in which each emitter and each detector is directed outwardly from the gauge, so that the strength of a signal received by a detector which signal has been issued by an adjacent emitter will be dependent upon the extent to which that signal has been reflected by material which is adjacent to the emitter and the detector, and in which the emitters and the detectors alternate with one another around the elongate support so as to provide 2N sets of emitter-detector pairs directed in 2N directions respectively.

With such a construction, when it is used to provide a measure of the depth of snow, and in the event that the depth indicated by one of the sets is different from the depth indicated by the other set or one of the other sets, this is indicative that the set indicating a greater depth has snow caked on it, so that the depth indicated by that set may be ignored. Thus such a construction provides the advantage that it can distinguish between a false depth indication arising from snow which has caked onto the gauge, and a true depth indication from snow which has built up from ground level.

The emitters and detectors may comprise light emitters and light detectors. Such a construction is especially useful to measure the depth of snow.

The processor may be constructed to enable it to distinguish between more than two different levels of signal received from each detector. This enables the gauge to distinguish between different types of snow, for example to distinguish between crisp snow, slushy snow, and icy snow.

The processor may be programmed to address each emitter in succession, from the intended lower end of the elongate support upwardly to the intended upper end thereof. With such a construction, the level of the detector at which the measured signal is lower than the signal from the immediately preceding detector may be indicative of the depth of the snow on the ground.

The processor may be programmed to store the level of the signal received from a detector, whilst an adjacent emitter is in the off condition or is otherwise in a condition in which it is not transmitting, then to switch the emitter into a condition in which it is transmitting a signal, at which time it compares the level of the signal received from the detector and stores the difference in the level of that signal relative to the level of the signal when the emitter was in the off condition or was otherwise in a condition in which it was not transmitting. This provides the advantage that the difference signal is independent of the ambient light, so that it does not have an effect on the results provided by the processor, the latter thereby giving the same indication irrespective of whether the gauge is operating during daytime or nighttime, for example.

Alternatively, the processor may be programmed to cause each emitter to transmit a varied signal, for example a pulsed signal, and it may be programmed to measure a correspondingly varied signal from an adjacent detector. This also provides the advantage of obtaining a measurement which is independent of the ambient light, and to give a greater signal to noise performance.

The emitters and the detectors may be in registration with one another. This ensures that a measurement may be obtained from an emitter/detector of one set at a given level which corresponds in level to an emitter/detector of the other set or of any one of the other sets.

A divider may be provided between the emitter and the detector of a given emitter-detector pair. The divider may have a degree of opacity relative to the signal issued by the emitter of the emitter-detector pair.

A divider may be provided between one emitter-detector pair and an adjacent emitter-detector pair. The divider may have a degree of opacity relative to the signal issued by the emitter of the pair or the adjacent pair. This reduces the likelihood of transmission of a signal directly from an emitter to a detector instead of by way of reflection by surrounding material the depth of which is to be measured.

BRIEF DESCRIPTION OF THE DRAWINGS

An example of a depth gauge made in accordance with the present invention is illustrated in greater detail in the accompanying drawings, in which:—

DETAILED DESCRIPTION OF THE INVENTION

Figure 1:
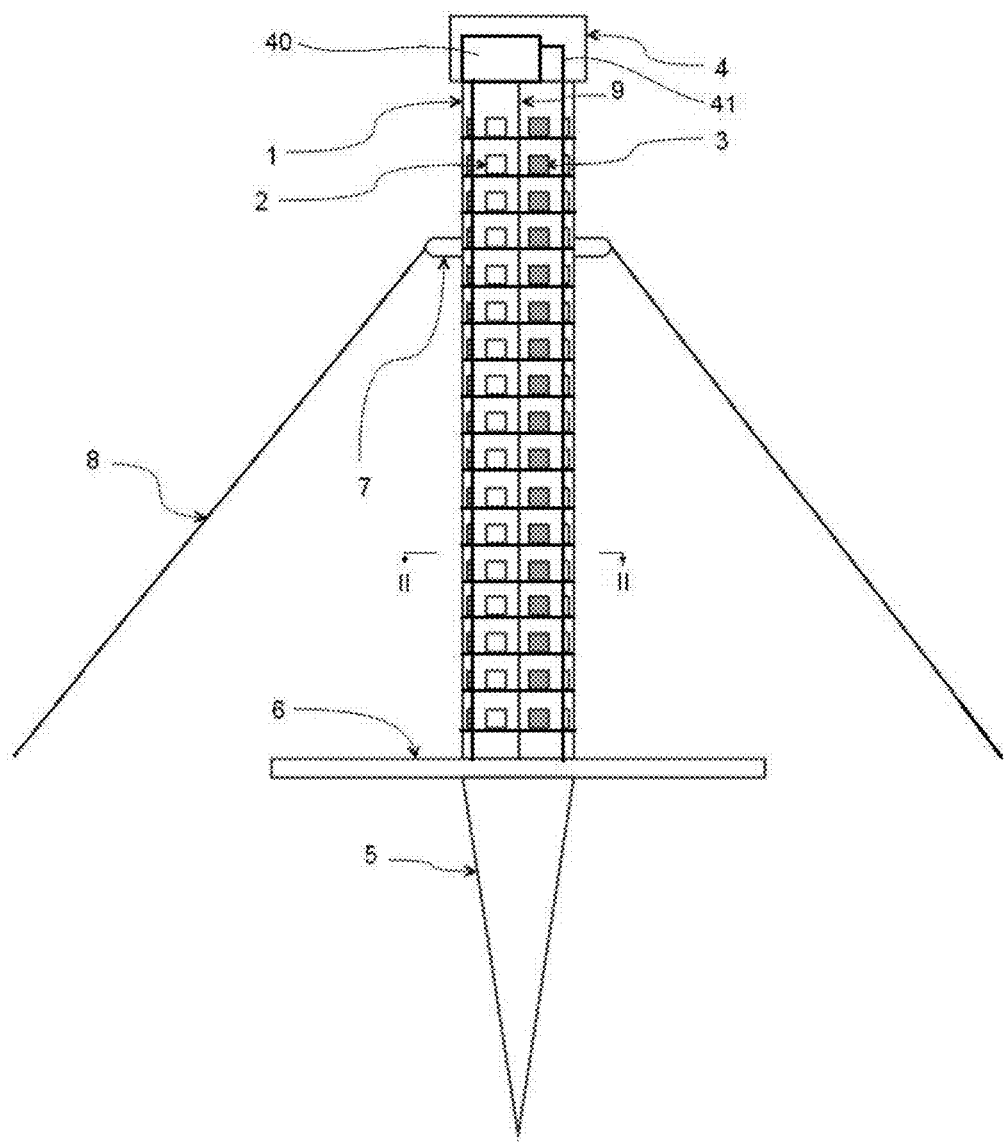
FIG. 1 is a side elevational view of a depth gauge embodying the present invention.

FIG. 1 shows a depth gauge comprising an upright rigid post 1 made of a transparent or translucent material, along which are arranged a multiplicity of emitters uniformly spaced apart from one another, and each comprising a light emitting diode 2. A multiplicity of light detectors 3 are also arranged along the rigid post 1 uniformly spaced apart from one another and in registration with the diodes 2. Each emitter 2 and adjacent detector 3 are in close proximity to one another. Each emitter and adjacent detector form an emitter-detector pair. Each such pair is seated on a generally horizontal platform 3a of the post 1, there being also a multiplicity of such support platforms spaced apart along the post 1.

The lower end of the post 1 is provided with a ground spike 5, with a stability disc or flange 6 sandwiched between the spike 5 and the post 1.

The upper end of the post 1 is provided with a processor 40 with a housing 4. The processor 40 is electrically connected via multiplex circuitry 41 to all the emitters 2 and to all of the detectors 3.

The upper half of the post 1 is provided with lugs 7 from which extend guy wires 8, down to ends further from the post 1 which ends are firmly secured to the ground. This provides the post 1 with further stability.

Figure 2:
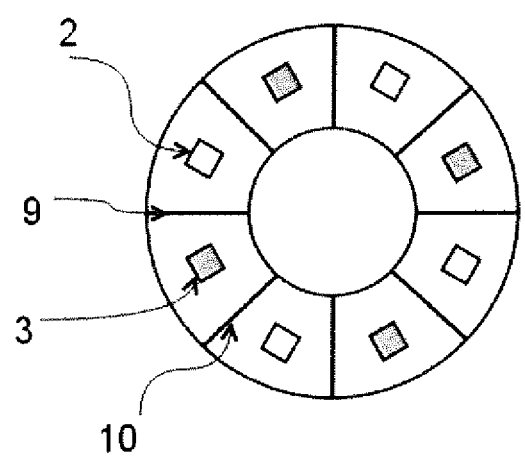
FIG. 2 is a cross-sectional view of the gauge in the plane indicated by the line II-II shown in FIG. 1.

As can be seen more readily from FIG. 2, each platform 3a supports four emitters and four detectors, equi-angularly spaced apart around the platform. Thus, on each platform, progressing therearound, emitters alternate with detectors. Each emitter 2 and each detector 3 is directed radially outwardly, in a given horizontal direction, so that each emitter 2 is directed at an angle of substantially 45° to both adjacent detectors 3, and each detector 3 is directed at an angle of substantially 45° to both adjacent emitters 2. Since each emitter 2 has two adjacent detectors 3 on a given level, and each detector 3 has two adjacent emitters 2 on a given level, each emitter 2 and each detector 3 constitutes one part of two emitter-detector pairs. There are dividers 9 and 10 between the emitter 2 and the detector 3 of each emitter-detector pair. These dividers may have a degree of opacity to reduce the extent to which light is transmitted directly from an emitter 2 to a detector 3 of a given emitter-detector pair.

It will be appreciated that the eight emitter-detector pairs of each of the platforms 3a are directed in the same eight respective directions as the emitter-detector pairs of all the other platforms 3a. As a result, there are eight sets of emitter-detector pairs, with respective bisectors constituted by dividers 9 or 10 between the emitters and detectors of each set, such that the eight bisectors are also uniformly spaced apart around the axis of the post 1, with an angle of 45° between adjacent dividers.

When in use, with the spike 5 inserted into the ground so that the flange 6 is pressed against the surface of the ground and the guy wires 8 are also secured to the ground as indicated in FIG. 1, the gauge illustrated in FIGS. 1 and 2 operates in the following manner.

The processor with housing 4 is duly programmed so that it reads the signal issuing from the detector 3 of each of the lowermost eight emitter-detector pairs. It does this whilst the emitters of each of those pairs is switched off, or is otherwise in a non-transmitting condition. It then switches on the emitters 2 of each emitter-detector pair of the lowermost platform 3a, in turn so that there is no interference in the measurements as between one emitter-detector pair and another. It then stores the difference between the reading it obtains from the detector 3 of each emitter-detector pair when the emitter 2 is in a transmitting condition to the reading it obtains from that detector 3 when the emitter 2 of the pair is not transmitting.

This is then repeated for the emitter-detector pairs of each platform 3a in succession upwardly from the bottom of the post 1 towards the top thereof.

The program then analyses these results to indicate at what level of the post 1 the said difference suddenly drops, by virtue of the fact that there is no material to reflect the light from the emitter 2 into the detector 3 of a given emitter-detector pair. It also provides an indication of any difference between the results obtained from the emitter-detector pairs on a given level of platform 3a, indicative for example of whether there is any caking of snow on the post 1, also from the values of the difference signals, as well as an indication of the nature of the material, for example whether it is crisp snow, slushy snow, icy snow, or somewhere between these conditions, or whether it is a fine frost, a coarse frost or block ice with bubbles, for example.

This procedure is completed with the emitters 2 and/or the detectors 3 switched to operate exclusively at a frequency corresponding to a wavelength of substantially 0.6 micrometers. It is then repeated with the emitters 2 and/or the detectors 3 switched to operate exclusively at a wavelength of substantially 1.1 micrometers. The procedure is then repeated with the emitters 2 and/or the detectors switched to operate exclusively at a wavelength of substantially 1.65 micrometers.

Figure 3:
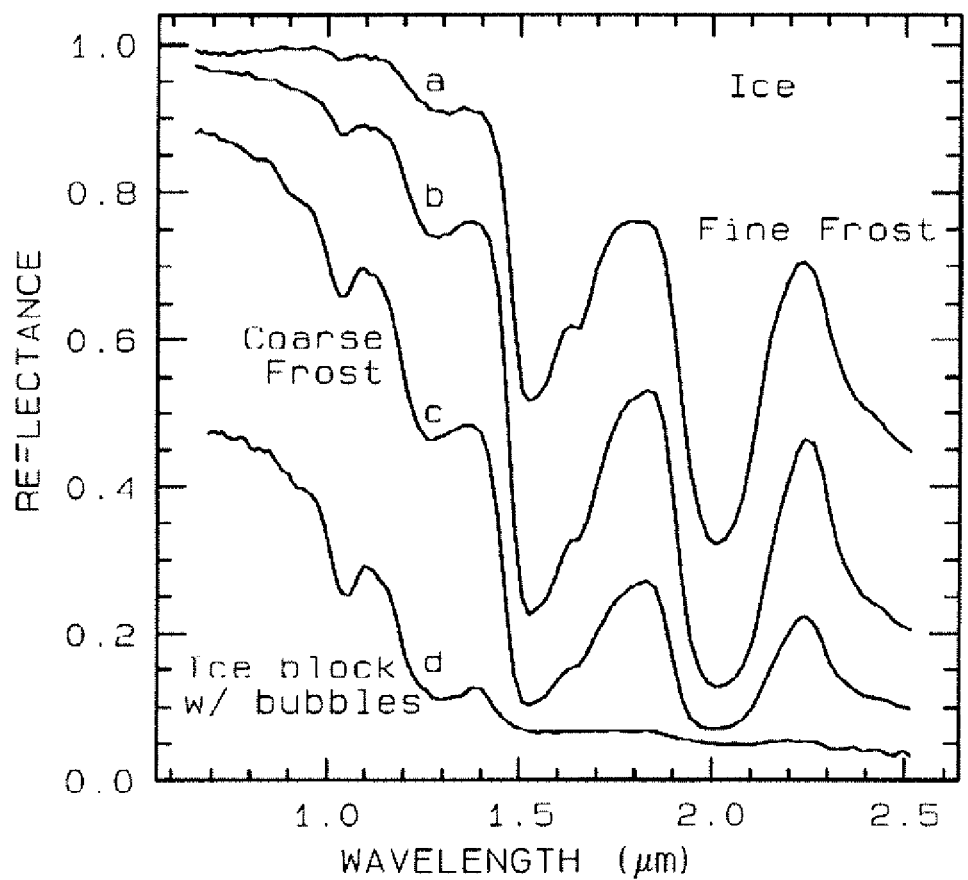
FIGS. 3 and 4 show different explanatory graphs.
Figure 4:
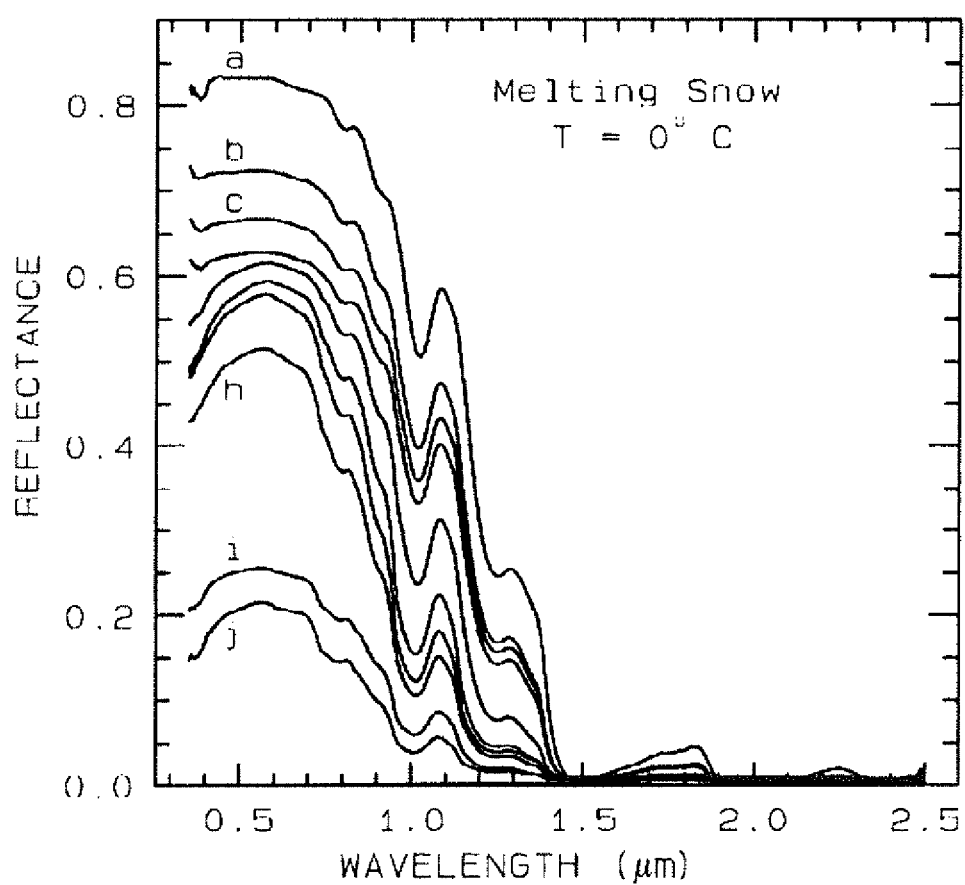

FIG. 3 shows a number of curves indicating the reflectance of fine frost, coarse frost and block ice with bubbles respectively as a function of wavelength of the radiation being reflected. FIG. 4 shows a number of curves indicating the reflectance of snow at 0° C. with different levels of water content respectively, as a function of wavelength of the radiation being reflected. These graphs are from Clark, R. N., Chapter 1: Spectroscopy of Rocks and Minerals, and Principles of Spectroscopy, in Manual of Remote Sensing, Volume 3, Remote Sensing for the Earth Sciences, (A. N. Rencz, ed.) John Wiley and Sons, New York, p 3-58, 1999.

In regard to FIG. 3, that reference states as follows: The near-infrared spectral reflectance of A) a fine grained (~50 μm) water frost, B) medium grained (~200 μm) frost, C) coarse grained (400-2000 μm) frost and D) an ice block containing abundant microbubbles. The larger the effective grain size, the greater the mean photon path that photons travel in the ice, and the deeper the absorptions become. Curve D is very low in reflectance because of the large path length in ice. The ice temperatures for these spectra are 112-140 K.

In regard to FIG. 4, that reference states as follows: A series of reflectance spectra of melting snow. The top curve (a) is at 0° C. and has only a small amount of liquid water, whereas the lowest spectrum (j) is of a puddle of about 3 cm of water on top of the snow. Note in the top spectrum, there is no 1.65-μm band because of the temperature. The 1.65-μm feature is temperature dependent and decreases in strength with increasing temperature (see Clark, 1981a and references therein). Note the increasing absorption at about 0.75 μm and in the short side of the 1-μm ice band, as more liquid water forms. The liquid water becomes spectrally detectable at about spectrum e, when the UV absorption increases. These graphs show how the different measurements at different frequencies or wavelengths can be used to indicate the nature of the material the depth of which is being measured with the gauge illustrated in FIGS. 1 and 2, including an indication of the change in the nature of the material at different depths.

All these indications are transmitted from the microprocessor with housing 4 remotely to a data capture centre, via wire or wireless communication, where the various values are recorded and observed so that any remedial activity that needs to take place can be appropriately directed, and so that generally a statistical record can be made.

Many such gauges may form part of a network to cover a wide area. The results from such a network may be published over the internet.

Numerous variations and modifications to the illustrated gauge may readily occur to the reader without taking the resulting construction outside the scope of the present invention. For example, there may be only two sets of emitters and two sets of detectors spaced apart along the post 1, or there may be three such sets of each, or more than four, for example eight. Stating this more generally, there may be N sets of emitters 2 and N sets of detectors 3, to have 2N sets of emitter-detector pairs directed in 2N directions respectively, where N>1. Although the emitters and detectors in the illustrated gauge are light emitters and light detectors, they may be constructed to emit and detect a different radiation or a different physical effect. Although the gauge has been described as a device for measuring the depth of snow, the gauge may be adapted to measure the depth of other materials or fluids, especially if they are light reflective. The post 1 may be anything from 50 cm in length to 15*m* in length, or indeed outside this range, depending upon the depths of snow to be measured in different parts of the world. The spike 5 may be about 30 cm in length. The processor with housing 4 may be programmed to detect a malfunctioning of any of the emitters and detectors.

The microprocessor with housing 4 may be programmed so that signals transmitted by each emitter 2 may be varied, for example pulsed, and so that the signals from the corresponding detector 3 that are processed by the microprocessor are those which are correspondingly varied. This avoids the need for measurements to be taken when the emitter is in the off condition, to avoid the effects of ambient light, and to provide a greater signal to noise performance.

The invention claimed is:

1. A depth gauge comprising an elongate support which is intended to be in an upright orientation when in use so that it has a lower end and an upper end, N sets of emitters, where N is an integer greater than 1, each set of emitters being mounted on the elongate support and being spaced apart therealong, and N sets of detectors each set of detectors being mounted on the elongate support and being spaced apart therealong, the 2N sets being directed in different respective directions and the emitters and the detectors being electrically connected to a processor to enable the latter to send signals to the emitters and receive signals from the detectors, wherein each emitter and each detector is directed outwardly from the gauge, so that the strength of a signal received by a detector which signal has been issued by an adjacent emitter will be dependent upon the extent to which that signal has been reflected by material which is adjacent to the emitter and the detector, and the emitters and the detectors alternate with one another around the elongate support so as to provide 2N sets of emitter-detector pairs directed in 2N directions respectively.

2. A depth gauge according to claim 1, wherein the emitters and detectors comprise light emitters and light detectors.

3. A depth gauge according to claim 1, wherein the processor is constructed to enable the processor to distinguish between more than two different levels of signal received from each detector.

4. A depth gauge according to claim 1, wherein the processor is programmed to address each emitter in succession, from the intended lower end of the elongate support upwardly to the intended upper end thereof.

5. A depth gauge according to claim 1, wherein the processor is programmed to store the level of the signal received from a detector, whilst an adjacent emitter is in the off condition or is otherwise in a condition in which the said adjacent emitter is not transmitting, then to switch the said adjacent emitter into a condition in which the said adjacent emitter is transmitting a signal, at which time the processor compares the level of the signal received from the detector and stores the difference in the level of that signal relative to the level of the signal when the emitter was in an off condition or was otherwise in a condition in which the emitter was not transmitting.

6. A depth gauge according to claim 1, wherein the processor is programmed to cause each emitter to transmit a varied signal and is programmed to measure a correspondingly varied signal from an adjacent detector.

7. A depth gauge according to claim 1, wherein the emitters and the detectors are in registration with one another.

8. A depth gauge according to claim 1, wherein a divider is provided between the emitter and the detector of each and every emitter-detector pair.

9. A depth gauge according to claim 8, wherein the divider has a degree of opacity relative to a signal issued by the emitter of the emitter-detector pair.

10. A depth gauge according to claim 1, wherein a divider is provided between one emitter-detector pair and an adjacent emitter-detector pair.

11. A depth gauge according to claim 10, wherein the divider referred to in claim 10 has a degree of opacity relative to a signal issued by the emitter of the pair or the adjacent pair.

* * * * *